United States Patent [19]

Gumm et al.

[11] 4,087,177
[45] May 2, 1978

[54] SHEET CONVEYOR MECHANISM FOR REPRODUCING APPARATUS

[75] Inventors: Peter Gumm, Glashutten; Horst Witte, Wiesbaden, both of Germany

[73] Assignee: Hoechst Aktiengesellschaft, Frankfurt am Main, Germany

[21] Appl. No.: 794,067

[22] Filed: May 5, 1977

[30] Foreign Application Priority Data

May 7, 1976 Germany ............................. 2620138

[51] Int. Cl.$^2$ ............................................. G03B 27/58
[52] U.S. Cl. ...................................... 355/47; 355/76; 355/117
[58] Field of Search ....................... 355/47, 48, 49, 76, 355/117, 104, 107, 108, 91

[56] References Cited

U.S. PATENT DOCUMENTS

| 3,451,754 | 6/1969 | Prew | 355/76 X |
| 3,547,535 | 12/1970 | McLean et al. | 355/49 |
| 3,642,368 | 2/1972 | Moss | 355/47 |
| 3,687,548 | 8/1972 | Yugoro | 355/76 |
| 3,709,596 | 1/1973 | Ulmer | 355/76 X |

Primary Examiner—Richard A. Wintercorn
Attorney, Agent, or Firm—Richard L. Schwaab

[57] ABSTRACT

Disclosed is a sheet conveying mechanism for an original to be reproduced in a reproducing apparatus, comprising means, including a rotatable drum having an air-permeable circumferential shell surface, for supporting the original; non-rotatable means disposed within the drum for dividing the space within the drum and the circumferential shell surface of the drum into three separate regions; means associated with the drum for selectively producing positive and negative pressure within each of the separate drum regions; means for exposing and scanning the original, positioned adjacent a first one of said separate drum regions; means, associated with the drum and being responsive to movement of the original around the drum, for controlling the pressure-producing means; and first and second means, cooperating with the drum and located adjacent the circumferential shell surface of the drum in the area of a second one of the separate drum regions, for transporting the original around the drum.

28 Claims, 9 Drawing Figures

SHEET CONVEYOR MECHANISM FOR REPRODUCING APPARATUS

BACKGROUND OF THE INVENTION

The present invention relates to a sheet conveyor mechanism for reproducing apparatus, and more particularly to such a conveyor mechanism in which an original to be copied is led past an exposure and scanning station by means of a transport device, is then further conveyed by at least two transport units arranged alongside a support surface for the original and is finally discharged at a delivery station, after it has circulated through the apparatus for the required number of times.

By means of the sheet conveyor mechanism described in German Offenlegungsschrift No. 2,026,063, documents to be copied are transported through the illumination and projection area of a reproducing machine. In the machine, a first transport unit designed as a document drum is disposed at the sheet processing station and is provided with means for securing the leading edge of a sheet to be transported and also with drive means which serve for moving the document past the sheet processing station as well as for stopping the drum at a predetermined point. A second transport unit composed of conveyor belts arranged at the lower right-hand part of the document drum moves the trailing edge of the sheet past the processing station, after the leading edge has been stopped. Due to the fact that the conveyor belts are arranged at the lower right-hand part of the document drum, the known conveyor mechanism is of considerable length so that the dimensions of the reproducing machine are increased and optimum utilization of space is prevented.

In German Auslegeschrift No. 1,902,112, a transport mechanism for reproducing apparatus has been disclosed in which an original to be copied is picked up from a supply stack and is conveyed to a support surface of an exposure station by conveyor belts; it is then further transported by conveyor belts and is finally placed on a delivery stack. In detail, a first switchable transport device takes up the individual original and conveys it to the support surface by means of a reversible conveyor belt mechanism set in motion by drive means which are also reversible. The drive means are controlled by a control circuit equipped with a distance measuring device which is actuatable by a switch responding to the individual original and which emits control signals as a function of the measuring values corresponding to the distance travelled. In this mechanism, no provision is made for stopping of the leading edge of the original. In order to allow reproduction of long originals the sheet conveyor mechanism must be elongated and it is, therefore, impossible to realize a compact design, desired in table copiers.

SUMMARY OF THE INVENTION

It is an object of the present invention to provide an improved sheet conveyor mechanism of the above-described type.

Another object of the invention resides in providing an improved sheet conveyor mechanism wherein an original of a length which may exceed the length of a support surface for the original can be successively circulated through the lighting and scanning station of a reproducing apparatus until the required number of copies has been made.

A further object resides in providing such a sheet conveyor mechanism which enables multiple copying of long originals with the reproducing apparatus operating at full copying capacity.

It is also an object of the invention to provide such a sheet conveying mechanism characterized by a compact design determined by the support surface.

Another object of the invention resides in the provision of a reproducing machine comprising the aforesaid improved sheet conveyor mechanism.

In accomplishing these and other objects of the invention, there has been provided a sheet conveying mechanism for an original to be reproduced in a reproducing apparatus, comprising: means, including a rotatable drum having an air-permeable circumferential shell surface, for supporting the original; non-rotatable means disposed within the drum for dividing the space within the drum and the circumferential shell surface of the drum into three separate regions; means associated with the drum for selectively producing positive and negative pressure within each of the separate drum regions; means for exposing and scanning the original, positioned adjacent a first one of said separate drum regions; means, associated with the drum and being responsive to movement of the original around the drum, for controlling the pressure-producing means; and first and second means, cooperating with the drum and located adjacent the circumferential shell surface of the drum in the area of a second one of the separate drum regions, for transporting the original around the drum. The drum is adapted to be positioned adjacent an exposure and scanning station of the reproducing apparatus and tangentially with respect to an original-feeding station of the reproducing apparatus located in front of the exposure and scanning station.

In one embodiment, the first transporting means comprises a pressing roller positioned adjacent the lighting and scanning station and on the opposite side thereof from the original-feeding station, and the second transporting means comprises a suction belt led around two rollers which suction belt is positioned diametrically opposite the lighting and scanning station.

In another embodiment, a third means for transporting the original around the drum is arranged alongside the drum on the side opposite the first transporting means, and each of the first and third transporting means comprises a conveyor belt led around a plurality (preferably three) rollers and is preferably capable of being selectively moved into contact with the drum surface. Alternatively, the first and third transporting means may be curved guide plates closely spaced on each side of the drum.

Other objects, features and advantages of the invention will become apparent to those skilled in the art from the detailed description of preferred embodiments which follows, when considered with the attached figures of drawing.

DETAILED DESCRIPTION OF PREFERRED EMBODIMENTS

According to the invention, the shell surface of a drum which is permeable to air serves as a support surface for the original to be copied. The interior of the drum is divided into drum chambers which are optionally supplied with pressure or suction air, as controlled by the circulating original, and a first and a second transport unit are arranged alongside the circumference of the drum in the area of the second drum chamber.

The inventive sheet conveyor mechanism has the advantage that originals which may be longer or shorter than the circumference of the drum can be reproduced by optimally utilizing the full copying capacity of the reproducing apparatus, without risking overlapping of the leading edge and the trailing edge of an exceptionally long original during transport. By arranging the units required for transporting an original alongside the circumference of the drum, a compact design is obtained as compared to an elongated design in the case of a flat support surface.

Figure 1:
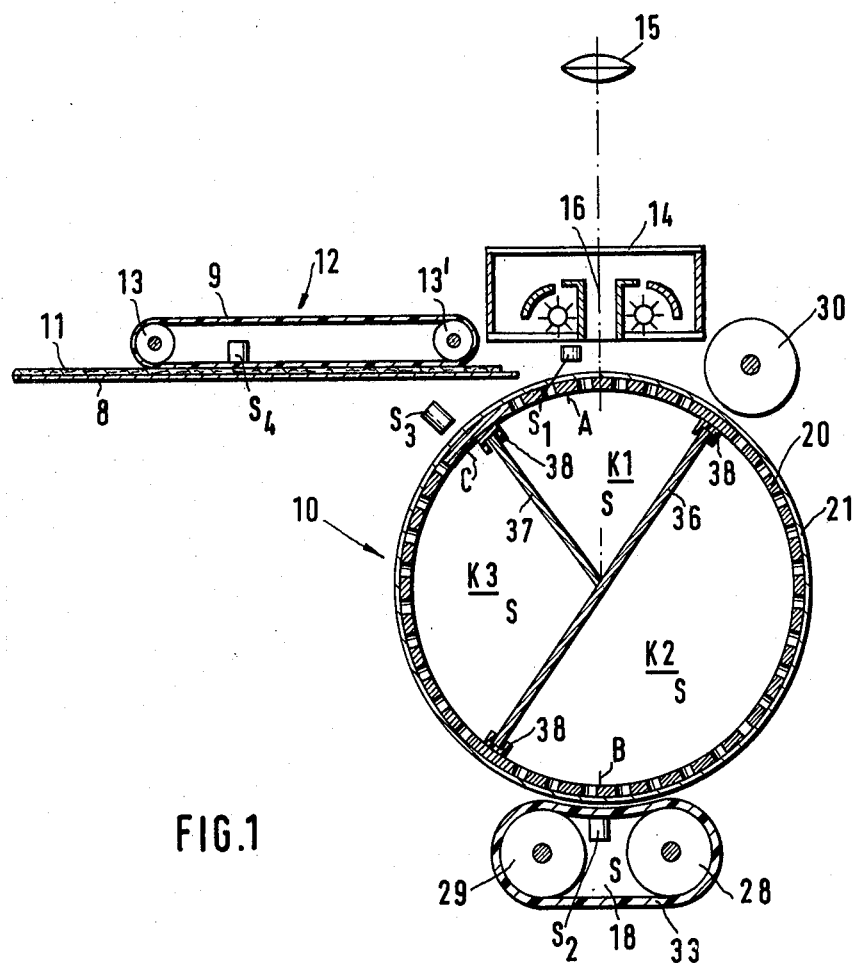
FIG. 1 is a diagrammatic sectional view of a sheet conveyor mechanism comprising a pressing roller as a first transport unit and a second transport unit for transporting the original over the support surface of a drum.

FIG. 1 is a diagrammatic sectional view of a sheet conveyor mechanism 10, comprising a drum 20 over which an original to be copied 11 is transported, as well as transport units 30 and 18 arranged alongside the shell surface of the drum 20 serving as a support surface 21. The sheet conveyor mechanism 10 is adapted for repeated exposure in reproducing apparatus, such as copying or electrophotographic reproducing machines, in which the original to be copied 11 is conveyed several times over the rotatably mounted drum 20. The original 11 is held during transport by means of suction air S which is supplied to the three drum chambers K1, K2 and K3. The three drum chambers K1, K2 and K3 are formed by a first partition plate 36 as well as a second partition plate 37, each plate being sealed on the inside of the drum shell 20 by gaskets 38.

The sheet conveyor mechanism 10 shown in FIG. 1 is used for thin flexible originals which are of uniform thickness across their width.

The first transport unit 30 is a pressing roller which is either driven by the rotating drum 20 or is self-propelled. This pressing roller ensures that the original 11 lies as flat as possible on the support surface 21.

First, the original to be transported 11 is lifted off from a supply stack in a manner not shown in the drawings. By a transport device 12 disposed close to the circumference of the drum 20 and positioned tangentially to the support surface 21, the original is then conveyed to the drum 20 over a support table 8 placed underneath the transport device 12. The transport device 12 may be a conventional endless conveyor belt 9 rotating around rollers 13 and 13', one of these rollers being driven and the other being free-wheeling. At a release point A for optical scanning of the original 11, the leading edge of the original actuates the first pulse generator $S_1$, which initiates movement of the drum 20 and of the second transport unit 18.

The second transport unit 18 is preferably composed of an endless suction belt 33 (i.e., perforated or the like) rotating around rollers 28 and 29, of which one is driven. At the same time, a negative pressure is produced in the drum chambers K1, K2 and K3 as well as in the second transport unit 18. The resulting suction effect ensures that the original 11 adheres to the support surface 21 of the drum 20 over a distance extending down into the region of the second transport unit 18 which is disposed diametrically opposite a lighting and scanning station 14 at the circumference of the drum. The lighting and scanning station 14 comprises lamps with reflectors as well as a scanning slot 16. Through the scanning slot 16, the illuminated area of the original 11 is projected upon an electrophotographic plate or drum, in a manner not shown, via an imaging optical system 15 in order to produce a latent electrostatic image of the original 11.

After having passed the scanning slot 16, the original 11 is moved along underneath the first transport unit 30 and is conveyed to the second transport unit 18 by means of the negative pressure in the second drum chamber K2. Instead of the above-described suction belt 33, a suction roller may be provided as the second transport unit 18.

In case of an original which is longer than the circumference of the drum, the trailing edge of the original 11 has not yet passed the fourth pulse generator $S_4$ located in the area of the support table 8 at the time its leading edge actuates a second pulse generator $S_2$ close to the lowest point of the drum 20. When the leading edge of the original 11 arrives at the second pulse generator $S_2$ the second drum chamber K2 is changed over from negative pressure S to positive pressure D, and the second transport unit 18 is stopped.

Figure 2:
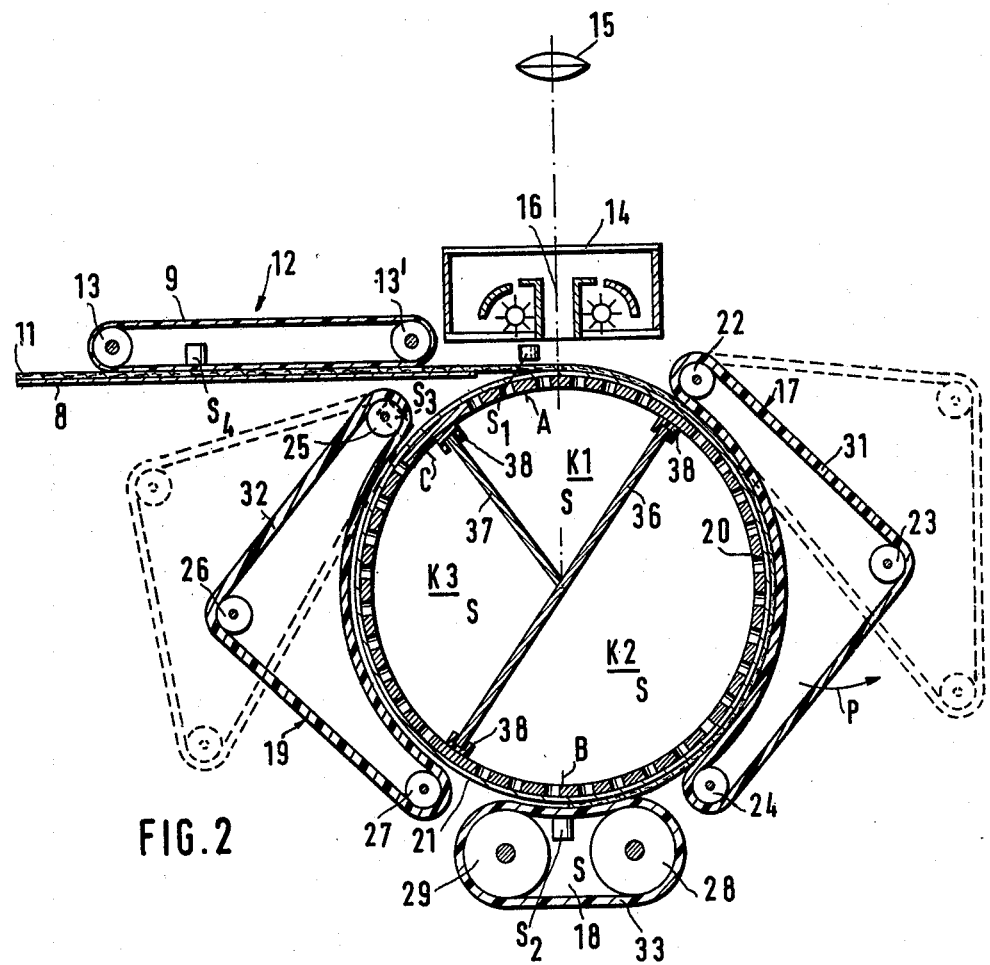
FIG. 2 is a diagrammatic sectional view of a further embodiment of the sheet conveyor mechanism, comprising transport units arranged about the circumference of the drum.
Figure 3:
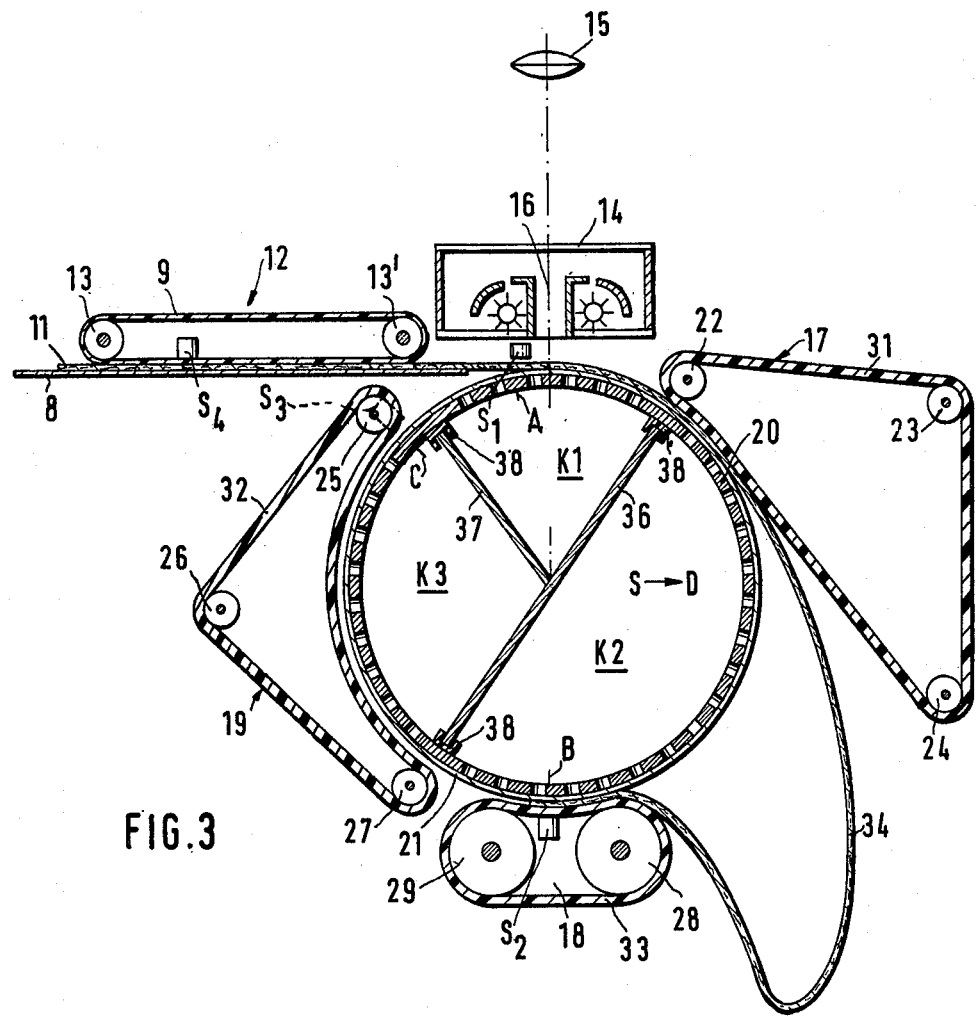
FIGS. 3 to 6 are diagrammatic sectional views of the embodiment in accordance with FIG. 2 showing the transported original at different positions along its path.

At the lighting and scanning station 14, the original 11 keeps moving forward by means of the negative pressure in the first drum chamber K1 and by means of the first transport unit 30, whereas it is lifted off from the support surface 21 of the drum 20 by the air pressure D escaping from the second drum chamber K2, so that a first loop 34 is formed, as illustrated in FIG. 3 in connection with a further embodiment of the sheet conveyor mechanism 10 according to the invention. This embodiment is explained in detail hereinbelow, and it is only pointed out here that, in either embodiment of the invention, the course of transport of the original 11 is in principle similar. When explaining the mode of operation of the first embodiment, some details are also referred to which are explained in connection with the representation of the second embodiment in FIGS. 2 to 6.

As soon as the trailing edge of the original 11 arrives at the fourth pulse generator $S_4$, the second transport unit 18 starts to run at a speed corresponding to the rotational speed of the drum 20 and the leading edge of the original 11 again moves forward.

When the original 11 has run around the drum 20 once, its leading edge arrives at the first pulse generator $S_1$ which changes over the third drum chamber K3 to positive pressure D and causes the second transport unit 18 to rotate at a speed exceeding the circumferential speed of the drum 20. In this way, a second loop 35 (see FIG. 5) of the original 11 is formed on the side of the drum next to the third drum chamber K3, while the first loop 34 (see FIG. 3) on the side of the second drum chamber K2 disappears.

By actuation of the first pulse generator $S_1$, the second drum chamber K2 is changed over from positive pressure D to negative pressure S, following a delay corresponding to from about one fourth to one eighth of one revolution of the drum. When the trailing edge of the original 11 actuates the second pulse generator $S_2$, the second transport unit 18 is switched back to a speed corresponding to the rotational speed of the drum 20. As soon as the leading edge of the original 11 arrives at the second pulse generator $S_2$, after having passed the lighting and scanning station 14 for the second time, the second drum chamber K2 is again changed over from negative pressure S to positive pressure D, and the second transport unit 18 is stopped.

The second transport unit 18 is switched on again after a delay, and the leading edge of the original 11 is moved forward. The time for switching-on is determined by the switching pulse released by the trailing edge of the original 11 at the second pulse generator $S_2$, which switching pulse is delayed by the period of stoppage of the second transport unit 18. The third drum chamber K3 is again changed over from positive pressure to negative pressure. The original 11 is circulated for the second time in the same manner as described above, i.e., the leading edge of the original 11 actuates the first pulse generator $S_1$ which changes over the third drum chamber K3 to positive pressure D and sets the second transport unit 18 in motion at a speed exceeding the rotational speed of the drum 20. As a result, a loop is formed, as was described above.

When an original to be copied is shorter than the circumference of the drum, the trailing edge of the original 11 arrives at the fourth pulse generator $S_4$ before the the leading edge has reached the second pulse generator $S_2$. In this case, negative pressure S is maintained in all drum chambers K1, K2 and K3, and the second transport unit 18 operates at a speed corresponding to the rotational speed of the drum 20. Following the last scanning operation, the second drum chamber K2 is changed over to positive pressure so that the original 11 is delivered at the bottom of the drum after it has passed the first transport unit 30.

Figure 7:
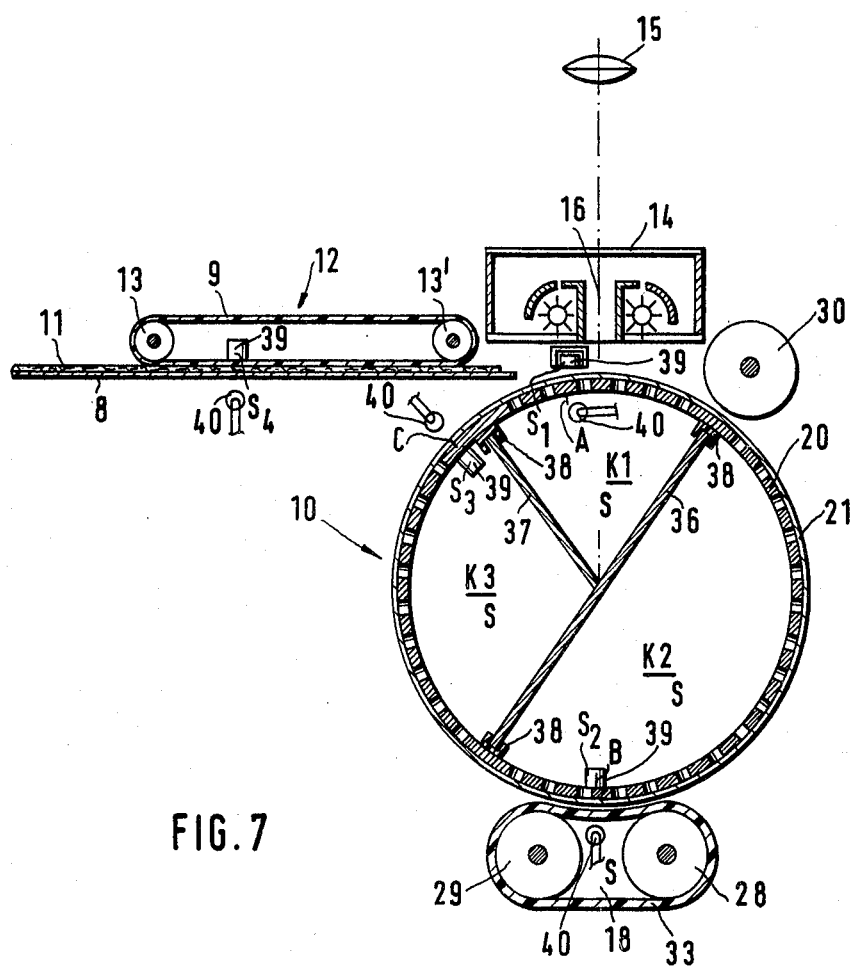
FIG. 7 is a sectional view illustrating a further embodiment of the invention, using pulse generators composed of sources of light and photocells, in contrast to the pulse generators according to FIGS. 1 to 6.

Preferably, the pulse generators $S_1$, $S_2$, $S_3$ and $S_4$ are mechanically operated switches; however, photocells 39 with associated sources of radiation 40, which, inter alia, may also operate in the infrared range, may also be chosen, as shown in FIG. 7. In order to prevent the photocells 39 from responding to the light of the lighting and scanning station 14, the photocells 39 may be designed to respond only to wavelengths emitted by the sources of radiation 40. In addition, the photocell 39 of the first pulse generator $S_1$ is screened from the lighting and scanning station 14.

It is also possible to use capacitive primary elements responding to the passage of the original 11, or any other equivalent response device.

The shell surface of the drum 20 serves as a support surface 21 for the original 11. It is permeable to air and may, e.g., be composed of a perforated metal foil provided with a white cladding.

Figure 8:
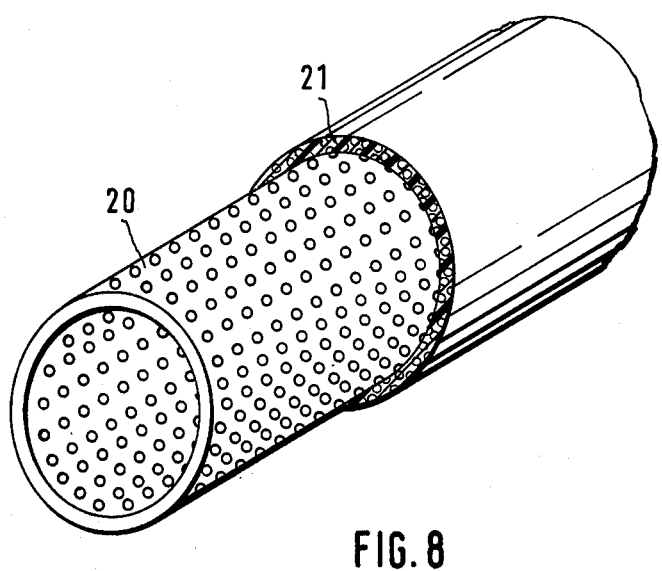
FIG. 8 is a perspective view partially in section, of a part of the drum.

In another embodiment of the invention, there may be provided, for example, a drum shell containing perforations of up to several millimeters in diameter and covered by a sleeve of fabric, plastic or similar material which is permeable to air and reflects radiation, as shown in FIG. 8.

Since the originals to be copied are in some cases transparent originals, a support surface 21 of a light color is chosen, most preferably white, in order to ensure optimum scanning. Preferably, a metal foil provided with a white cladding and containing very fine perforations is used as the support surface 21, the perforations being generally of a diameter which cannot be perceived with the naked eye. However, it is also possible to use perforations of diameters which, during scanning, do not show differences in brightness.

When copying thicker originals or originals with lateral cardboard strips, so that thicknesses vary over the widths of the originals, the negative pressure in the drum chambers may no longer produce a suction effect which is sufficient for adequate adherence of the original to the drum. In this case, the original 11 is pressed onto the support surface 21 by a first transport unit 17 (see FIGS. 3–6) designed as an endless conveyor belt 31 rotating around rollers 22, 23 and 24, as well as by an additional third transport unit 19, similarly composed of an endless conveyor belt 32 rotating around rollers 25, 26 and 27. Naturally, the first transport unit 17 as well as the third transport unit 19 may each be provided with several conveyor belts instead of only one belt. The two transport units 17 and 19 are pivotable on their top rollers 22 and 25, so that they can be selectively withdrawn from or applied to the drum 20. When the transport units 17 and 19 are turned toward the drum 20, the conveyor belts 31 and 32 are partly in contact with the support surface 21, thus ensuring that the circulating original 11 lies flat against the drum 20.

Figure 9:
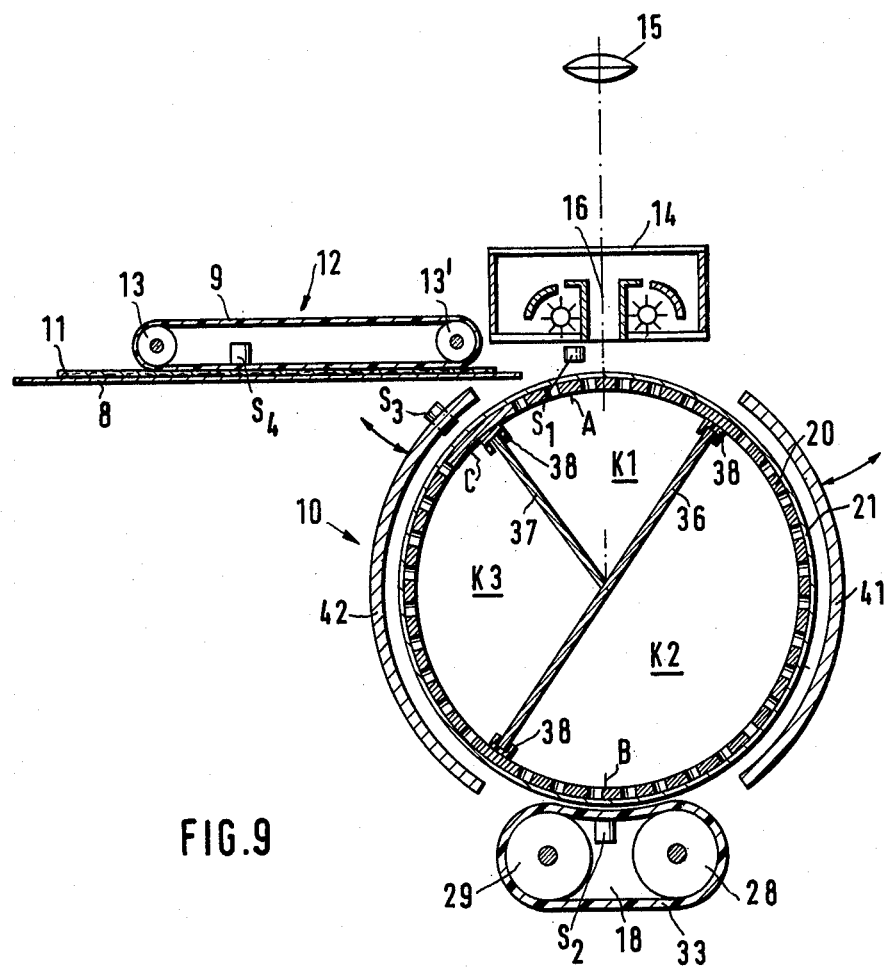
FIG. 9 is a sectional view illustrating another embodiment comprising guide plates disposed about the circumference of the drum.

Instead of the two pivotable transport units 17 and 19, pivotable guide plates 41 and 42 may be provided, as shown in FIG. 9. These guide plates are shaped to match the curvature of the drum 20 and are arranged at a distance of several millimeters, preferably about three millimeters, from the surface of the drum.

In FIG. 2, the two transport units 17 and 19 are shown in two different positions, i.e., applied to the drum, as indicated by continuous lines, and withdrawn from the drum, as indicated by dotted lines. The fed-in original 11 actuates the first pulse generator $S_1$ which starts movement of the drum 20 and of the second transport unit 18. A negative pressure is produced in the drum chambers K1, K2 and K3 as well as in the second transport unit 18, and the first transport unit 17 and the third transport unit 19 are arranged close to the drum 20, as shown in FIG. 2. At this moment, the leading edge of the original 11 has just arrived at the second pulse generator $S_2$, disposed opposite a first switching point B at the circumference of the drum 20. The leading edge of the original 11 actuates the second pulse generator $S_2$ which changes over the second drum chamber K2 to positive air pressure D and stops the second transport unit 18. Simultaneously, the pivotable first transport unit 17 is withdrawn from the support surface 21 of the drum 20; the original 11, the leading edge of which is retained by the aspirating second transport unit 18, is pulled toward the drum by the negative pressure in the first drum chamber K1 and is lifted off from the surface of the drum by positive pressure D in the second drum chamber K2, so that a first loop 34 is formed close to the second transport unit 18, as shown in FIG. 3.

The trailing edge of the moving original 11 actuates the fourth pulse generator $S_4$, which re-starts the stopped transport unit 18 at a speed corresponding to the circumferential speed of the drum 20. The distance between the fourth and the first pulse generators is preferably less than the distance between the first and the second pulse generators.

Figure 4:
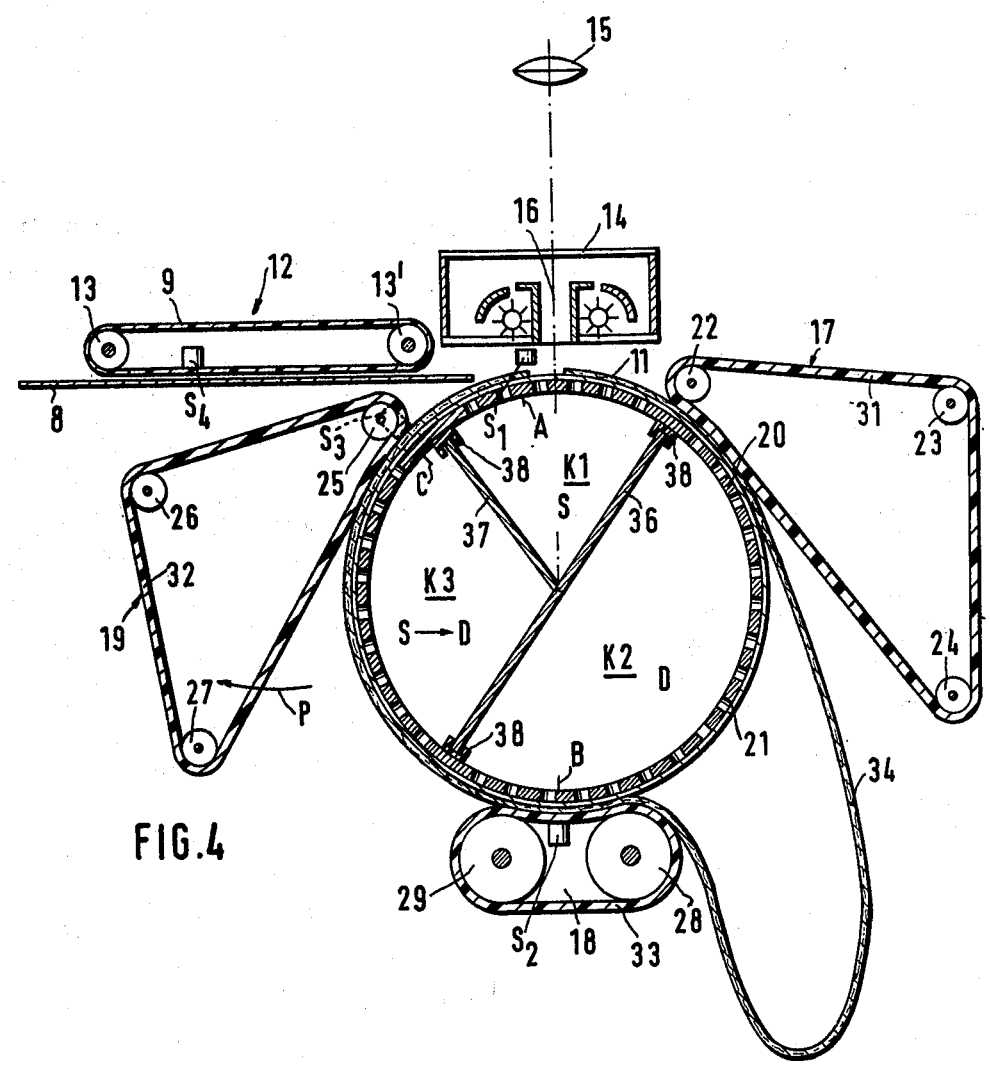
Figure 5:
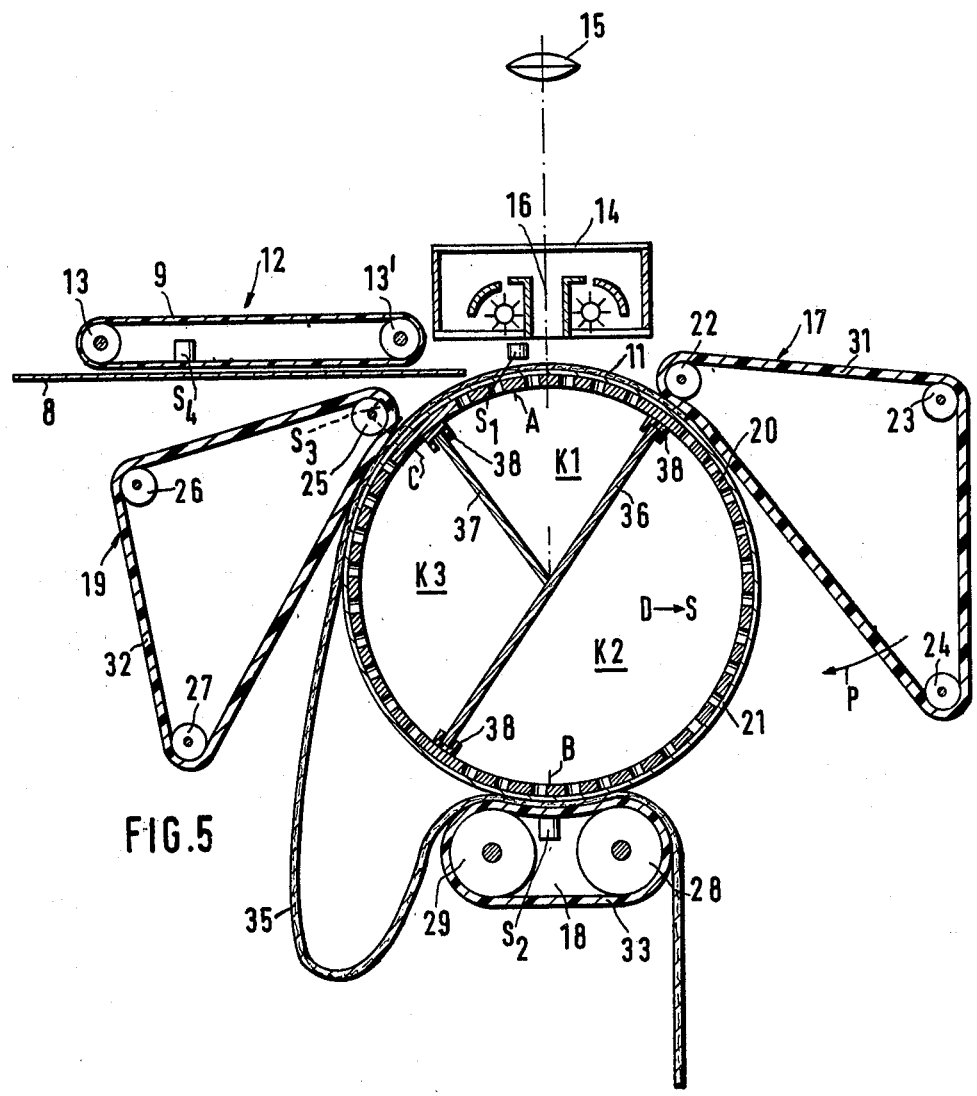

As soon as the leading edge actuates the first pulse generator $S_1$, after the original 11 has circulated through the machine for the first time, as shown in FIG. 4, the third drum chamber K3 is changed over to positive pressure D and the second transport unit 18 is driven at a speed exceeding the rotational speed of the drum 20. At the same time, the transport unit 19 is turned in the direction of the arrow P in FIG. 4. Negative pressure S is maintained in the first drum chamber K1 in order to secure the leading edge of the original 11, which is lifted off in the area of the third drum chamber K3, since this chamber operates with positive pressure D. The trailing edge of the original 11 is moved forward by the second transport unit 18 rotating at a speed exceeding the speed of the drum 20, so that a second loop 35 is formed, as shown in FIG. 5.

Figure 6:
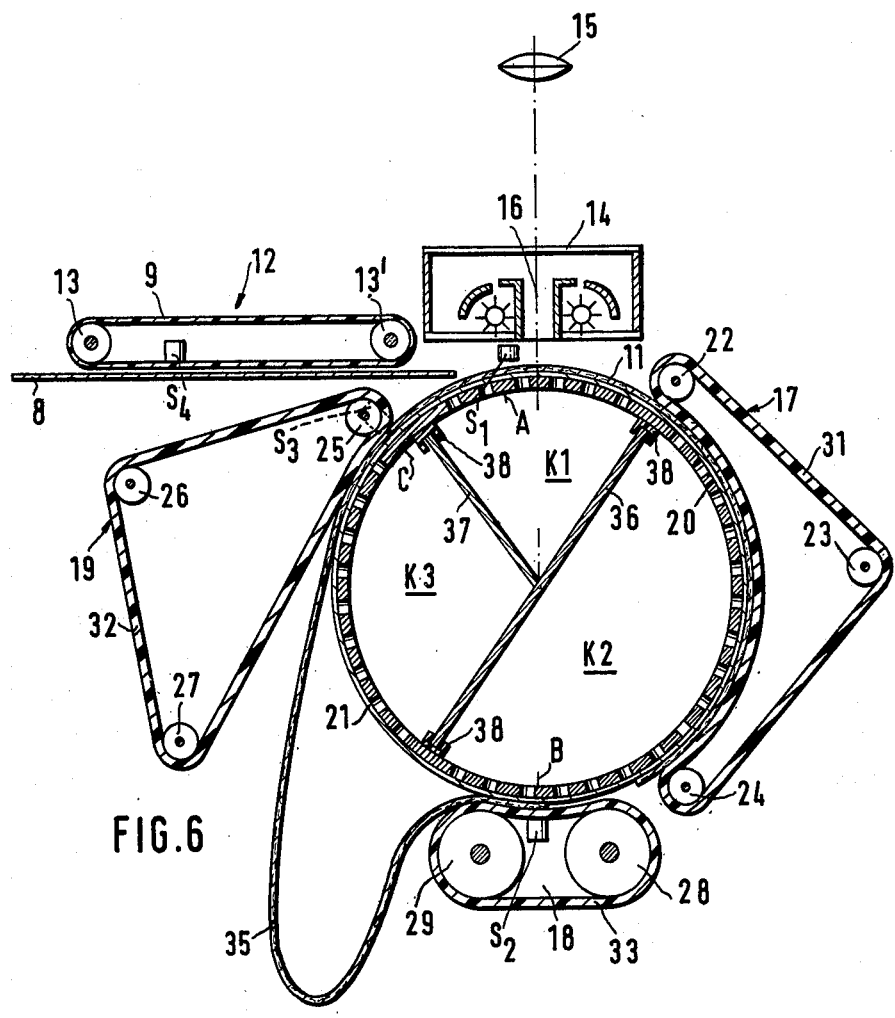

Following a delay corresponding to from about one fourth to one eighth of one revolution of the drum 20, the first pulse generator $S_1$ changes over the second drum chamber K2 from positive pressure D to negative pressure S (see FIG. 5), while the first loop 34 disappears and the second loop 35 still exists. By actuating the first pulse generator $S_1$, the first transport unit 17 is applied to the drum, as shown in FIG. 6, simultaneously with changing over of the second drum chamber K2 to negative pressure S. The trailing edge of the original 11 then actuates the second pulse generator $S_2$, which switches back the suction belt 33 of the second transport unit 18 to the circumferential speed of the drum 20.

A third pulse generator $S_3$ is arranged at a second switching point C at the circumference of the drum. The moment the original 11 passes the lighting and scanning station 14 for the second time, in repeated copying, the third pulse generator $S_3$ assumes the function of the fourth pulse generator $S_4$, i.e., it is actuated by the trailing edge of the original 11, which is no longer in contact with the support table 8 and thus does not pass the area of the fourth pulse generator $S_4$.

When the leading edge of the original 11 arrives at the second pulse generator $S_2$, after it has passed the lighting and scanning station 14 for the second time, the drum chamber K2 is changed over from negative pressure to positive pressure D and the original is further transported as already described with reference to FIG. 2 and the following figures, the only difference being that the trailing edge of the original 11 is no longer on the support table 8.

When an original 11 is shorter than the circumference of the drum, the trailing edge of the original 11 actuates the fourth pulse generator $S_4$ during the first copying cycle before the leading edge arrives at the second pulse generator $S_2$. Then all three drum chambers K1, K2 and K3 operate with negative pressure, and the first transport unit 17 as well as the third transport unit 19 are applied to the drum. The suction belt 33 of the second transport unit 18 rotates at a speed corresponding to the circumferential speed of the drum 20. After the last scanning operation, the second drum chamber K2 is changed over from negative pressure S to positive pressure D, the first transport unit 17 is withdrawn from the drum 20 and the original 11 is conveyed to a delivery station not shown in the drawings.

What is claimed is:

1. A sheet conveying mechanism for an original to be reproduced in a reproducing apparatus, comprising:

means, including a rotatable drum having an air-permeable circumferential shell surface, for supporting the original;
   non-rotatable means disposed within said drum for dividing the space within said drum and the circumferential shell surface of the drum into three separate regions;
   means associated with said drum for selectively producing positive and negative pressure within each of said separate drum regions;
   means for exposing and scanning the original, positioned adjacent a first one of said separate drum regions;
   means, associated with said drum and being responsive to movement of the original around said drum, for controlling said pressure-producing means; and
   first and second means, cooperating with said drum and located adjacent the circumferential shell surface of the drum in the area of a second one of said separate drum regions, for transporting the original around the drum.

2. The sheet conveying mechanism as defined by claim 1, wherein said drum is adapted to be positioned adjacent an exposure and scanning station of the reproducing apparatus and tangentially with respect to an original-feeding station of the reproducing apparatus located in front of the exposure and scanning station, and wherein said first transporting means comprises a pressing roller positioned adjacent the lighting and scanning station and on the opposite side thereof from the original-feeding station.

3. The sheet conveying mechanism as defined by claim 1, wherein said second transporting means comprises a suction belt led around two rollers, which suction belt is positioned diametrically opposite the lighting and scanning station.

4. The sheet conveying mechanism as defined by claim 1, further comprising third means, arranged alongside the circumference of the drum in the area of a third of said separate regions, for transporting the original around the drum.

5. The sheet conveying mechanism as defined by claim 4, wherein said first transporting means comprises at least one conveyor belt led around three rollers and said first transporting means is capable of being selectively brought into contact with the circumference of the drum.

6. The sheet conveying mechanism as defined by claim 4, wherein said third transporting means comprises at least one conveyor belt led around three rollers, which conveyor belt(s) are capable of being selectively brought into contact with the circumference of the drum.

7. The sheet conveying mechanism as defined by claim 5, wherein each of said first and third transporting means is pivotable about its top roller.

8. The sheet conveying mechanism as defined by claim 3, wherein said second transporting means further comprises means for operating at different speeds.

9. The sheet conveying mechanism as defined by claim 3, wherein said control means comprises a plurality of pulse generators arranged alongside the shell surface of the drum, including a first pulse generator preceding the lighting and scanning station, which in response to the first passage of the leading edge of the original actuates production of negative pressure in said separate drum regions by said pressure producing means, and further comprising means for setting the second transporting means in motion together with the drum in response to said passage of the leading edge of the original past said first pulse generator.

10. The sheet conveying mechanism as defined by claim 1, wherein said control means comprises a fourth pulse generator disposed in the path of the original in the area of a feed point for the original on the drum.

11. The sheet conveying mechanism as defined by claim 9, wherein said control means includes a second pulse generator in the area of the second transporting means, which in response to passage of the leading edge of the original actuates change-over of the second drum region from negative pressure to positive pressure, and further comprising means for stopping the second transporting means responsive to said passage past said second pulse generator.

12. The sheet conveying mechanism as defined by claim 11, further comprising means controlled by the second pulse generator for pivoting the first transporting means away from the shell surface of the drum, whereby formation of a first loop of the original on the side of the drum adjacent the second drum region is permitted.

13. The sheet conveying mechanism as defined by claim 2, further comprising means responsive to actuation of said fourth pulse generator by the trailing edge of the original during the first cycle, for setting in motion the stopped second transporting means at a speed corresponding to the circumferential speed of the drum.

14. The sheet conveying mechanism as defined by claim 13, further comprising means, responsive to the second passage of the leading edge of the original past the first pulse generator, for changing over a third drum region to positive pressure and for causing the second transporting means to operate at a speed exceeding the speed of the drum, whereby the second transporting means moves the trailing edge of the original forward and the original forms a second loop on the side of the drum adjacent the third drum region.

15. The sheet conveying mechanism as defined by claim 4, further comprising means, operable following a delay corresponding to from about one fourth to one eighth of one revolution of the drum, and responsive to the first pulse generator, for changing over the second drum region from positive pressure to negative pressure, whereby the first loop disappears while the second loop is formed.

16. The sheet conveying mechanism as defined by claim 5, further comprising means, responsive to actuation of the first pulse generator for bringing the first transport unit into contact with the drum simultaneously with changing over of the second drum region to negative pressure.

17. The sheet conveying mechanism as defined by claim 5, further comprising means, responsive to passage of the trailing edge of the original past the second pulse generator, for switching back the suction belt of the second transporting means to the circumferential speed of the drum.

18. The sheet conveying mechanism as defined by claim 17, further comprising a third pulse generator arranged at a switching point on the circumference of the drum ahead of said first pulse generator, said third pulse generator being adapted to take over the function of said fourth pulse generator when the original passes the lighting and scanning station for the second time.

19. The sheet conveying mechanism as defined by claim 9, wherein said control means comprising means, actuatable by actuation of the fourth pulse generator by the trailing edge of an original, which is shorter than the circumference of the drum, before the leading edge has arrived at the second pulse generator, for initiating production of negative pressure in all three drum regions and for rotating the suction belt of the second transporting means at a speed corresponding to the circumferential speed of the drum.

20. The sheet conveying mechanism as defined by claim 19, further comprising means, responsive to the last scanning operation in repeated copying of the original, for changing over the second drum region to positive pressure and for withdrawing the first transporting means from the drum, whereby the original is released for delivery.

21. The sheet conveying mechanism as defined by claim 9, wherein said pulse generators comprise switches which are mechanically actuated by the leading and trailing edges of the original.

22. The sheet conveying mechanism as defined by claim 10, wherein each of said pulse generators comprise a photocell with an associated source of radiation relatively positioned so that the leading edge and the trailing edge of the original produce switching pulses in the photocells by interrupting or letting pass the light rays directed from the source upon the photocells, whereby the switching operations are initiated.

23. The sheet conveying mechanism as defined by claim 1, wherein said drum surface comprises perforated metal provided with a white cladding.

24. The sheet conveying mechanism as defined by claim 1, wherein said drum surface comprises perforated metal covered by a sleeve of air-permeable material.

25. The sheet conveying mechanism as defined by claim 24, wherein said material is fabric or a sheet of polymeric material.

26. The sheet conveying mechanism as defined by claim 1, wherein said dividing means comprise partition plates which contact the inside surface of the drum shell and gaskets interposed at the points of contact.

27. The sheet conveying mechanism as defined by claim 1, wherein said first and the third transporting means comprise guide plates which are arranged in closely spaced relationship with the surface of the drum.

28. A reproduction apparatus, comprising an exposure and scanning station, means for feeding an original to be reproduced to said exposure and scanning station, means for collecting a discharged original after it has been exposed and scanned, and a sheet conveying mechanism for the original as defined by claim 1.

* * * * *